(12) United States Patent
Modavis

(10) Patent No.: US 6,943,889 B2
(45) Date of Patent: Sep. 13, 2005

(54) ATHERMAL INTERFEROMETRIC DEVICE

(75) Inventor: Robert Modavis, Painted Post, NY (US)

(73) Assignee: JDS Uniphase Corporation, San Jose, CA (US)

(*) Notice: Subject to any disclaimer, the term of this patent is extended or adjusted under 35 U.S.C. 154(b) by 106 days.

(21) Appl. No.: 10/629,446

(22) Filed: Jul. 29, 2003

(65) Prior Publication Data
US 2004/0021870 A1 Feb. 5, 2004

Related U.S. Application Data
(60) Provisional application No. 60/398,827, filed on Jul. 29, 2002.

(51) Int. Cl.$^7$ ................................................. G01B 9/02
(52) U.S. Cl. ....................................................... 356/451
(58) Field of Search ................................. 356/450, 451, 356/453, 454, 460, 467, 477, 519; 372/32

(56) References Cited

U.S. PATENT DOCUMENTS

| | | | | |
|---|---|---|---|---|
| 4,784,490 A | * | 11/1988 | Wayne | 356/487 |
| 5,412,676 A | * | 5/1995 | Schnier et al. | 372/32 |
| 6,490,394 B1 | * | 12/2002 | Beall et al. | 385/39 |
| 6,507,404 B1 | * | 1/2003 | Nishioki et al. | 356/451 |
| 6,577,398 B1 | * | 6/2003 | Ducellier | 356/450 |
| 6,621,580 B2 | * | 9/2003 | Myatt et al. | 356/519 |
| 6,694,066 B2 | * | 2/2004 | Xie et al. | 385/11 |
| 6,697,160 B2 | * | 2/2004 | Tsuda | 356/453 |
| 6,826,343 B2 | * | 11/2004 | Davis et al. | 385/126 |

FOREIGN PATENT DOCUMENTS

JP 401238081 A * 9/1989

* cited by examiner

Primary Examiner—Samuel A. Turner
(74) Attorney, Agent, or Firm—Allen, Dyer, Doppelt, Milbrath & Gilchrist, P.A.

(57) ABSTRACT

An athermal interferometric wavelocker is disclosed having a beam splitter combiner and a first arm of a first material having a first refractive index, a first length, and a first coefficient of expansion; and, a second arm of a second material having a second refractive index, a second length, and a second coefficient of expansion. The refractive indices, lengths and coefficients of expansion of the first arm and the second arm are selected to provide a substantially athermal structure operating at ambient temperatures. The first arm and second arm have inner end faces that meet adjacent faces of the beam splitter and combiner. The first and second arms are of a different optical path length such that light launched into the beam splitter and combiner, interferes upon recombining, and is output from a combiner output port to provide a wavelocker signal having a detectable characteristic which varies with wavelength.

18 Claims, 2 Drawing Sheets

Performance of an athermal Mach-Zehnder.

ATHERMAL INTERFEROMETRIC DEVICE

CROSS REFERENCE TO RELATED APPLICATION

This application claims priority of U.S. Provisional Patent Application No. 60/398,827 filed Jul. 29, 2002, entitled "Athermal Interferometer", which is incorporated herein by reference for all purposes.

FIELD OF THE INVENTION

This invention relates generally to interferometers, and more particularly to an interferometer that is at least substantially athermal.

BACKGROUND OF THE INVENTION

An important class of devices for telecommunications applications are wavelength tunable laser transmitters. Because of their aging characteristics these laser transmitters can shift in wavelength over time for a given set of fixed operating parameters. In order to correct for this shift in wavelength, some means of wavelength stabilization is typically employed. One type of wavelength stabilizer, or 'wavelocker' relies on the spectral transmittance of a Fabry-Perot etalon. These etalons are designed such that the transmitted spectrum is repeated at regular frequency intervals (ie the channel spacing). The transmission of a portion of the laser light through these devices gives a measure of the laser's wavelength since the transmitted spectrum of these devices is stable over time. One problem with these devices is that the spectrum is, in general, not fixed as the operating temperature changes. The temperature shift in these etalons arises from a change in the optical path length with temperature, that is:

$$\frac{1}{nL}\frac{d(nL)}{dT} = \alpha + \frac{1}{n}\frac{dn}{dT} \quad (1)$$

where $\alpha$ is the coefficient of thermal expansion, L is the length of the etalon, n is the index of refraction of the etalon and the product, nL, is the optical path length. An etalon could be made athermal if a material could be found such that the right hand side of the above equation equals zero. Unfortunately, at this time, we do not know of any such material.

Fabry Perot etalons and Gires Tournois etalons are used as building blocks in a variety of optical devices to provide functionality to a host of solutions to applications in the optical domain. By way of example, U.S. Pat. No. 5,798,859 in the name of Colbourne et al., discloses a wavelength locker circuit, wherein an element having a wavelength dependent characteristic such as a Fabry Perot etalon is used to provide an output signal having an amplitude that varies with wavelength. The intensity of a reference signal derived from an input signal is compared with an output from the Fabry Perot etalon to provide a feedback signal that corresponds to the frequency of the input signal. Another wavelocker circuit that utilizes an etalon is disclosed in U.S. Pat. No. 6,560,252 in the name of Colbourne et al.

As with most optical circuitry, changes in temperature typically adversely affect the performance of a device. For example, the optical path length and free spectral range changes in an etalon as temperature varies. In the majority of instances this resulting change in output response with a temperature change is unwanted and deleterious to the operation of the device. It is generally assumed and desired, for most optical devices to operate in a stable manner with drifting temperature. When two different etalons are required, having different optical path lengths, and their output responses are to be combined in some manner, differences in their individual responses due to changes in temperature can be highly problematic compromising the functionality of such a system. By way of example, this can also occur in optical devices such as Mach Zehnder interferometers, where a fixed, predetermined, or predictable optical path length difference in two arms is required and must be maintained. One solution is to provide a temperature compensation circuit, which is costly to implement, and requires power to heat or cool in order to maintain an optical circuit or component at a constant temperature.

It is an object of this invention, to provide an interferometric device that is substantially athermal; that is, being substantially unaffected by temperature changes at normal operating temperatures.

It is a further object of this invention, to provide a method for selecting lengths of two arms of an interferometer, given two materials, their refractive indices and coefficients of thermal expansion, that will yield a substantially athermal structure.

It is a further object of this invention to provide a substantially athermal interferometer that does not require an active temperature compensation circuit.

SUMMARY OF THE INVENTION

In accordance with an aspect of the invention, there is provided, an interferometer comprising a beam splitter and combiner for splitting an input beam into two sub-beams and for combining two sub-beams into a single beam;

a first arm having a length $l_1$ optically coupled to the beam splitter and combiner, said first arm defining a first path within a first material having a refractive index $n_1$ and a coefficient of expansion $\alpha_1$ a second arm having a length $l_2$ optically coupled with the beam splitter and combiner, said second arm defining a second path within a second material having a refractive index $n_2$ and a coefficient of expansion $\alpha_2$ wherein the lengths of the two arms are selected such that they satisfy the equation:

$$l_1\left[n_1\alpha_1 + \frac{dn_1}{dT}\right] - l_2\left[n_2\alpha_2 + \frac{dn_2}{dT}\right] = 0.$$

In accordance with another aspect of the invention there is provided an at least substantially athermal bulk-optic interferometer comprising a beam splitter combiner for splitting an input beam provided at a input port into two sub-beams and for combining two sub-beams into a single interference beam directed to the beam combiner output port;

a first block of material defining a first arm having a length of substantially $l_1$ optically coupled to the beam splitter and combiner, said first arm defining a first path having a refractive index $n_l$ and a coefficient of expansion $\alpha_1$ a second block of material defining a second arm having a length substantially $l_2$ optically coupled with the beam splitter and combiner, said second arm defining a second path having a refractive index $n_2$ and a coefficient of expansion $\alpha_2$, wherein, $n_1$, $n_2$, $\alpha_1$, and $\alpha_2$ are predetermined, wherein the lengths $l_1$ and $l_2$ of the two arms are selected such that they satisfy the equation:

$$l_1\left[n_1\alpha_1 + \frac{dn_1}{dT}\right] - l_2\left[n_2\alpha_2 + \frac{dn_2}{dT}\right] = 0.$$

In accordance with yet another aspect of the invention there is provided A substantially athermal interferometric wavelocker comprising:

a beam splitter combiner;

a first arm of a first material having a first refractive index, a first length, and a first coefficient of expansion;

a second arm of a second material having a second refractive index, a second length, and a second coefficient of expansion;

wherein the refractive indices, lengths and coefficients of expansion of the first arm and the second arm are selected to provide a substantially athermal structure operating at ambient temperatures, the first arm and second arm having inner end faces that meet adjacent faces of the beam splitter and combiner, the first and second arms being of a different optical path length such that light launched into the beam splitter and combiner, interferes upon recombining, and is output from a combiner output port to provide a wavelocker signal which having a detectable characteristic which varies with wavelength.

BRIEF DESCRIPTION OF THE DRAWINGS

Exemplary embodiments of the invention will now be described in conjunction with the drawings in which.

DETAILED DESCRIPTION

Figure 1:
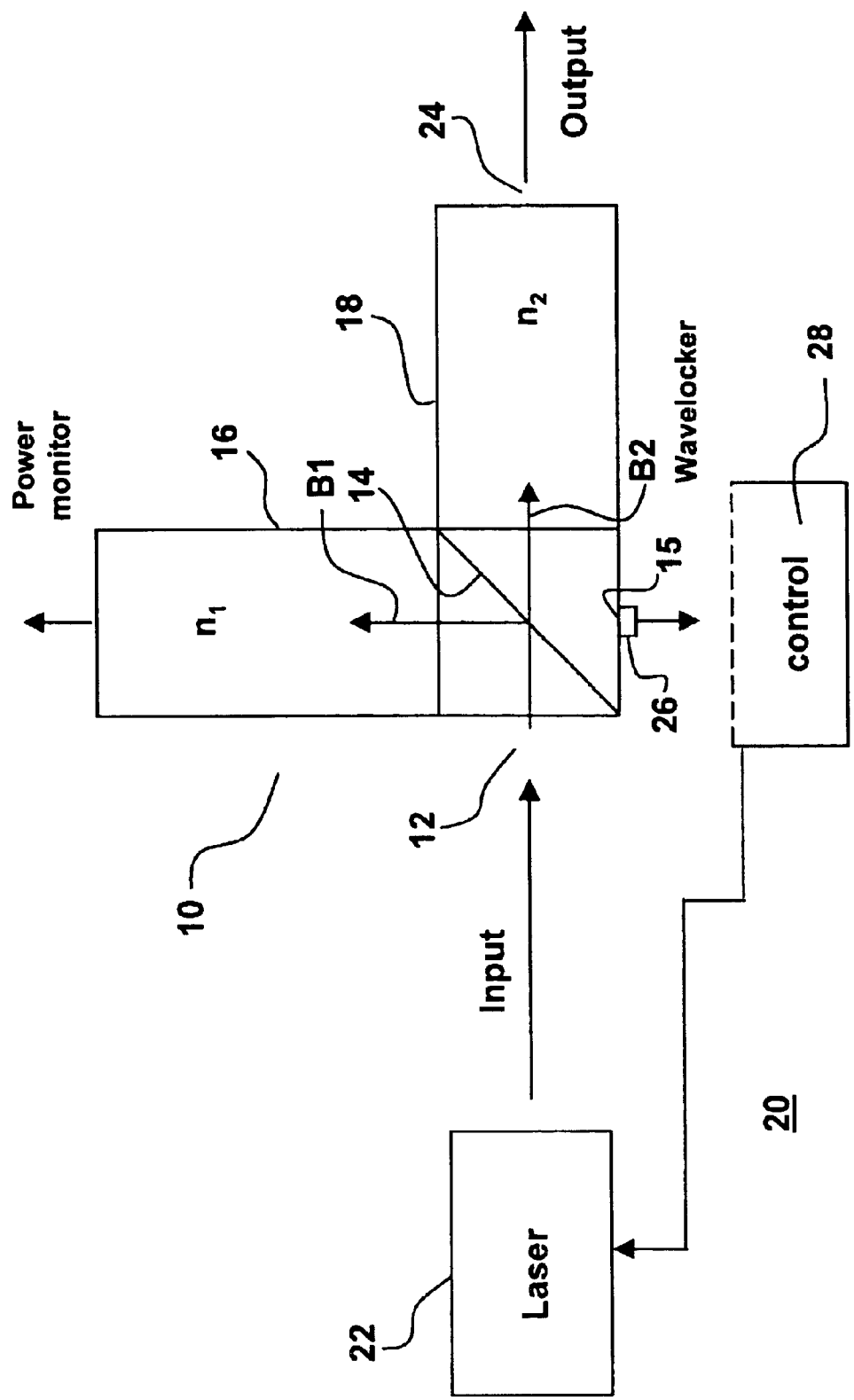
FIG. 1 is a schematic block diagram of a wavelocker circuit having a Twyman-Green interferometer to provide an indication of a change in wavelength to a detector.

Referring now to FIG. 1 a Twyman-Green interferometer 10 is shown. In accordance with an embodiment of this invention, this device can be used as a portion of a wavelocker circuit 20 for locking the wavelength of a laser 22 output signal. A small percentage of input light received at an input port 12 from the laser 22 is tapped for analysis, and a larger remaining portion of the input light is passed-through to an output port 24 to an intended destination. The tapped light us used to monitor changes in wavelength. A control circuit 28 provides a control signal to adjust the wavelength of the laser output signal in dependence upon these changes in wavelength.

The laser 22 is optically coupled to the input port 12 of a beam splitting and combining portion 14 of the Twyman-Green interferometer 10; Light incident upon the beam splitting and combining portion 14 received from the laser 22 is separated into two sub-beams $B_1$ and $B_2$ which are directed orthogonally along first and second arms 16 and 18 respectively of the Twyman-Green interferometer. The first arm 16 has a refractive index $n_1$ and a coefficient of thermal expansion $\alpha_1$. The second arm 18 has a refractive index $n_2$ and a coefficient of thermal expansion $\alpha_2$. Outer free ends of the interferometer arms 16 and 18 can be completely reflective, sending back all light incident upon them to be recombined interferometrically. Notwithstanding, in an embodiment that is described hereafter, the outer ends of the arms 16 and 18 are only partially reflective, one being more reflective than the other to allow predetermined different amounts of light to pass therethrough, one as a monitoring port and one as a pass-through port.

In operation after the incoming light is separated, the two sub-beams $B_1$ and $B_2$ are re-combined and interfered after traversing different arms having different optical path lengths with a constant optical path length difference, through the Twyman-Green interferometer 10. A detector 26 at an output monitor port 15 of the Twyman-Green interferometer 10 is disposed to capture this re-combined light, which forms fringe patterns having varying intensity with varying wavelength of the laser input signal. Thus, a change in intensity corresponds to a change in wavelength. Since the optical path length difference that the two sub-beams $B_1$ and $B_2$ traverse is constant between the arms 16 and 18 any change in the output response will accurately indicate a change in wavelength of the input light. However, if the optical path length difference between the arms, which is a function of the refractive index, coefficient of expansion, and physical length of each arm varies with temperature, the output response detected at the detector will provide a spurious inaccurate wavelength measurement. In order to avoid variation with temperature, the interferometer must be made athermal.

Another device that may be suitable as a wavelocker component for detecting change in wavelength is a Mach-Zehnder interferometer. Whereas all the light in a single etalon traverses a common path, the light in a Mach-Zehnder as with the Twyman Green interferometer is split between two paths.

Because of this separation of the light paths the condition for athermality of this device differs from that for an etalon. This athermality condition is derived below.

The intensity transmittance of a Mach-Zehnder is given by:

$$I = \cos^2\left[\frac{\pi}{\lambda}(n_1 l_1 - n_2 l_2)\right] \tag{2}$$

where: $n^1$, $l_1$ is the index and length of path 1, $n_2$, $l_2$ is the index and length of path 2, and $\lambda$ is the wavelength.

The transmittance of a Mach-Zehnder is periodic and this periodicity is determined by the indices and lengths of the two paths according to:

$$|n_1 l_1 - n_2 l_2| = \frac{c}{\Delta v} \tag{3}$$

where $\Delta v$ is the frequency interval and c is the vacuum speed of light. In order to produce an athermal Mach-Zehnder we need to find materials such that the derivative with respect to temperature of the argument of equation (2) is zero, that is, we require:

$$\frac{d}{dT}(n_1 l_1 - n_2 l_2) = 0. \tag{4}$$

Expanding this derivative gives:

$$\frac{d}{dT}(n_1 l_1 - n_2 l_2) = l_1 \frac{dn_1}{dT} + n_1 \frac{dl_1}{dT} - l_2 \frac{dn_2}{dT} - n_2 \frac{dl_2}{dT} = 0. \tag{5}$$

This can be re-written in terms of the coefficient of thermal expansion, $\alpha$, as:

$$l_1\left[n_1\alpha_1 + \frac{dn_1}{dT}\right] - l_2\left[n_2\alpha_2 + \frac{dn_2}{dT}\right] = 0 \qquad (6)$$

where:

$$\alpha_i = \frac{1}{l_i}\frac{dl_i}{dT}. \qquad (7)$$

Once two materials have been selected the only parameters required to be selected are the lengths of the two arms, $l_1$ and $l_2$. In order to produce a device with the proper periodicity and the desired property of athermality it is required to satisfy equations (3) and (6). Inspection shows that we have two equations with two unknowns ($l_1$ and $l_2$) which can be solved, provided these equations are linearly independent. Notwithstanding, to achieve a practicable solution, $l_1$ and $l_2$ must be positive numbers. This can be achieved if [$n\alpha + dn/dT$] for each material is the same sign, both positive or both negative. Since [$n\alpha + dn/dT$] is positive for almost any material, this condition is not often restrictive.

In contrast with a single etalon, where no material is known to satisfy the athermality condition of equation 1, it appears that with two distinct materials, one can produce a Mach-Zehnder interferometer with a desired periodicity and athermality. Notwithstanding, practical considerations will show that certain materials are better candidates than others.

By way of example. $\Delta v = 25$ GHz the following two glasses from the Schott™ catalog:

| 1. | n | α | dn/dT |
|---|---|---|---|
| Glass 1: N-LAK12 | 1.66 | 7.6 ppm | −2.7 ppm |
| Glass 2: SF57 | 1.80 | 8.3 | 6.0 |

Using these values the path lengths needed for athermality and a periodicity of 25 GHz are:

| $l_1$ = 14.858 mm |
|---|
| $l_2$ = 7.036 mm. |

Figure 2:
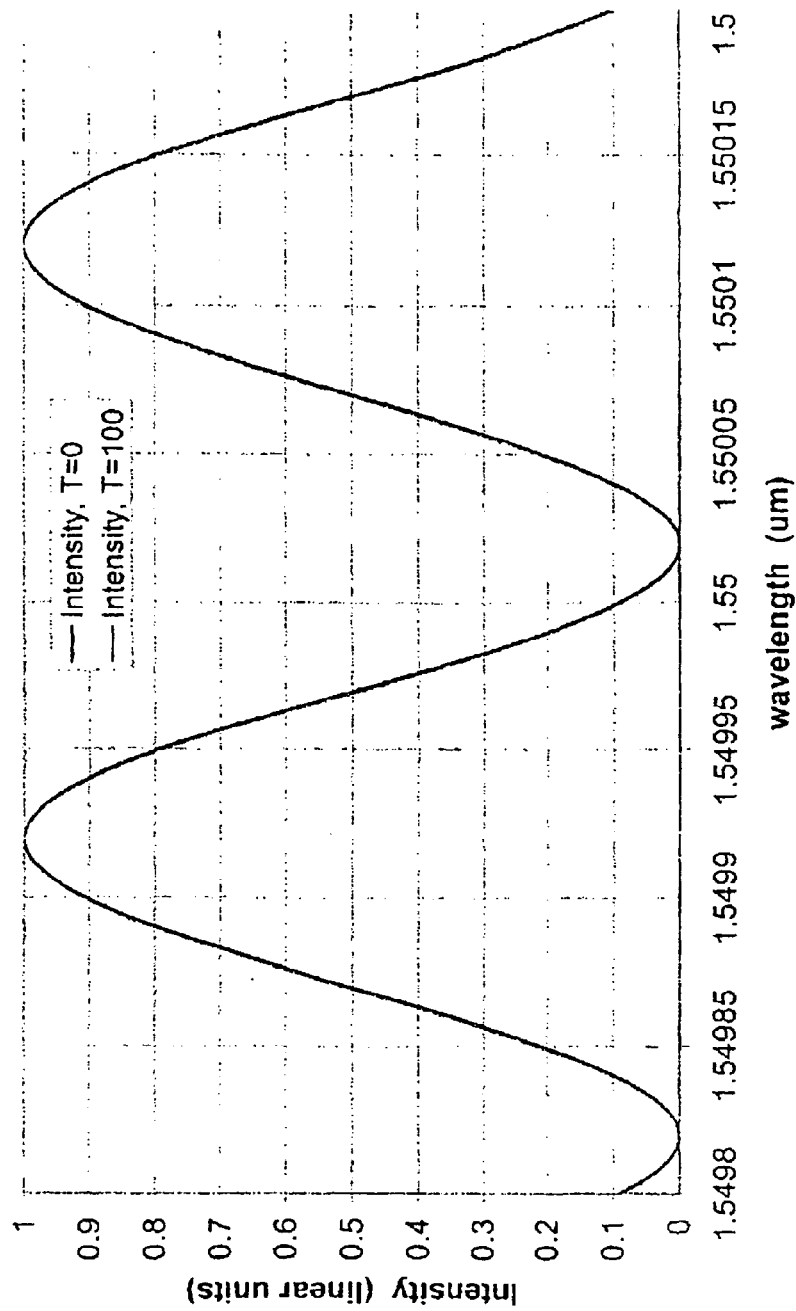
FIG. 2 is a graph of intensity versus wavelength for the athermal interferometer in accordance with the invention.

The spectral performance of this device is shown in FIG. 2 at two temperatures separated by 100° C.:

The athermal performance is clearly seen in this graph; the two curves are separated by less than 1 pm.

The above example shows how to construct an interferometer with zero thermal shift. It should be understood, however, that due to normal manufacturing tolerances, that absolute athermality might not be achievable in practice. Notwithstanding, the term athermal should be understood to include small, negligible amounts of thermal dependency.

Although the above results were derived for a Mach-Zehnder, this analysis can also be applied to other interferometer schemes. Because of the unequal physical path lengths of the above example, it might be easier to construct a Tyman-Green interferometer as illustrated in FIG. 1.

Of course, numerous other embodiments may be envisaged, without departing from the spirit and scope of the invention.

What is claimed is:

1. An interferometer comprising a beam splitter and combiner for splitting an input beam into two sub-beams and for combing two sub-beams into a single beam;

a first arm having a length $l_1$ optically coupled to the beam splitter and combiner, said first arm defining a first path within a first material having a refractive index $n_1$ and a coefficient of expansion $\alpha_1$; and, a second arm having a length $l_2$ optically coupled with the beam splitter and combiner, said second arm defining a second path within a second material having a refractive index $n_2$ and a coefficient of expansion $\alpha_2$ wherein the lengths of the two arms are selected such that they satisfy the equation:

$$l_1\left[n_1\alpha_1 + \frac{dn_1}{dT}\right] - l_2\left[n_2\alpha_2 + \frac{dn_2}{dT}\right] = 0.$$

2. An interferometer as defined in claim 1, wherein the interferometer is at least substantially athermal, and wherein the beam splitter and combiner is coupled to inner end faces of the first and second arm, in a Twyman-Green configuration.

3. An interferometer as defined in claim 2, wherein an outer end face of the first arm and an outer end face of the second arm are at least partially reflecting.

4. An interferometer as defined in claim 3 wherein a monitoring port is provided for receiving light transmitted through at least one of the two partially reflecting end faces.

5. An interferometer as defined in claim 4, wherein the beam splitter and combiner splits an input beam incident thereon into two substantially equal beams.

6. An interferometer as defined in claim 5 wherein the beam splitter and combiner spits light incident thereon into two beams disproportionately.

7. A at least substantially athermal bulk-optic interferometer comprising a beam splitter combiner for splitting an input beam provided at a input port into two sub-beams and for combining two sub-beams into a single interference beam directed to the beam combiner output port;

a first block of material defining a first arm having a length of substantially $l_1$ optically coupled to the beam splitter and combiner, said first arm defining a first path having a refractive index $n_1$ and a coefficient of expansion $\alpha_1$; and, a second block of material defining a second arm having a length substantially $l_2$ optically coupled with the beam splitter and combiner, said second arm defining a second path having a refractive index $n_2$ and a coefficient of expansion $\alpha_2$, wherein, $n_1$, $n_2$, $\alpha_1$, and $\alpha_2$ are predetermined, wherein the lengths $l_1$ and $l_2$ of the two arms are selected such that they satisfy the equation:

$$l_1\left[n_1\alpha_1 + \frac{dn_1}{dT}\right] - l_2\left[n_2\alpha_2 + \frac{dn_2}{dT}\right] = 0.$$

8. An at least substantially athermal interferometer as defined in claim 7, wherein a first end face of the first arm and a first end face of the second arm are directly coupled to the beam splitter and combiner and wherein a second end face of the first arm and a second end face of the second arm are at least partially reflective, such that a portion of the two sub-beams incident upon the end faces is reflected back to the beam splitter combiner.

9. A wavelocker for determining if an input beam is substantially locked in wavelength comprising:

an at least substantially athermal interferometer as defined in claim 8, having an output port at a second end of a second end face of the second block for receiving most of an input beam launched into the beam splitter and combiner.

10. A wavelocker as defined in claim 9 wherein the second end face of the first arm provides a port for power monitoring, and wherein the beam combiner output port provides a port for determining if a wavelength of the input beam has varied.

11. A wavelocker as defined in claim 10, wherein the end face of the second end face of the first arm is substantially reflective, and wherein the end face of the second end face of the second arm is substantially transmissive.

12. A wavelocker as defined in claim 11, wherein the beam splitter and combiner provides substantially more of the input signal to the second arm than to the first arm.

13. A substantially athermal interferometric wavelocker comprising:

a beam splitter combiner;

a first arm of a first material having a first refractive index, a first length, and a first coefficient of expansion; and, a second arm of a second material having a second refractive index, a second length, and a second coefficient of expansion;

wherein the refractive indices, lengths and coefficients of expansion of the first arm and the second arm are selected to provide a substantially athermal structure operating at ambient temperatures, the first arm and second arm having inner end faces that meet adjacent faces of the beam splitter and combiner, the first and second arms being of a different optical path length such that light launched into the beam splitter and combiner, interferes upon recombining, and is output from a combiner output port to provide a wavelocker signal having a detectable characteristic which varies with wavelength.

14. A substantially athermal interferometric wavelocker as defined in claim 13, further comprising means responsive to the wavelocker signal for detecting a variation in wavelength.

15. A substantially athermal wavelocker as defined in claim 14 wherein the beam splitting ratio of the beam splitter combiner, and the reflectivities of the outer end faces of the first arm and second arm are selected such that substantially most of the light launched into the beam splitter combiner is passed out of one of the outer end faces as an output signal, and such that a lesser portion of the light is utilized for wavelocking or power monitoring.

16. An interferometer as defined in claim 1, wherein the interferometer is at least substantially athermal and wherein the beam splitter and beam combiner are separate components, the interferometer forming a Mach Zehnder interferometer.

17. A wavelocker as defined in claim 1, wherein the sign of $[n_1\alpha_1+dn_1/dT]$ is equal to the sign of $[n_2\alpha_2+dn_2/dT]$.

18. A wavelocker as defined in claim 7, wherein the sign of $[n_1\alpha_1+dn_1/dT]$ is the same as the sign of $[n_2\alpha_2+dn_2/dT]$.

* * * * *